(12) United States Patent
Napchi et al.

(10) Patent No.: US 9,400,988 B2
(45) Date of Patent: Jul. 26, 2016

(54) MEDIA CONTENT BASED ADVERTISING

(71) Applicant: HIRO Media Ltd., Tel-Aviv (IL)

(72) Inventors: Ariel Napchi, Tel-Aviv (IL); Oded Napchi, Tel-Aviv (IL); Hed Bar-Nissan, Tel-Aviv (IL); Alan Oken, RaAnana (IL); Shahar Daniel, Tel-Aviv (IL)

(73) Assignee: HIRO Media Ltd., Tel-Aviv (IL)

( * ) Notice: Subject to any disclaimer, the term of this patent is extended or adjusted under 35 U.S.C. 154(b) by 52 days.

(21) Appl. No.: 13/847,535

(22) Filed: Mar. 20, 2013

(65) Prior Publication Data

US 2013/0311309 A1 Nov. 21, 2013

Related U.S. Application Data

(60) Provisional application No. 61/649,317, filed on May 20, 2012.

(51) Int. Cl.
*G06Q 30/02* (2012.01)
*G06Q 10/10* (2012.01)

(52) U.S. Cl.
CPC .......... *G06Q 30/0277* (2013.01); *G06Q 10/107* (2013.01)

(58) Field of Classification Search
CPC ..................................................... G06Q 30/00
See application file for complete search history.

(56) References Cited

U.S. PATENT DOCUMENTS

| 7,162,691 | B1* | 1/2007 | Chatterjee ......... G06F 17/30896 707/E17.108 |
|---|---|---|---|
| 2009/0089830 | A1* | 4/2009 | Chandratillake et al. ........ 725/32 |
| 2009/0150210 | A1* | 6/2009 | Athsani et al. .................. 705/10 |
| 2011/0173071 | A1* | 7/2011 | Meyer et al. ............... 705/14.54 |
| 2012/0124618 | A1* | 5/2012 | Ruiz-Velasco et al. ......... 725/32 |

* cited by examiner

*Primary Examiner* — Eric Netzloff

(57) ABSTRACT

A method of selecting a promotional content for media content items. The method comprises providing a database hosting a plurality of uniform resource locators (URLs) each of a web document through which at least one of a plurality of media content items being available for presentation, receiving an ad request for embedding an in stream advertisement in a media content item, analyzing the ad request to extract a video content URL of a certain web document through which the media content item is made available for presentation, matching between the video content URL and at least one of the plurality of URLs to acquire at least one identifier of the media content item, selecting an in stream advertisement based on the at least one identifier, and responding to the ad request with an indication of the in stream advertisement.

14 Claims, 3 Drawing Sheets

MEDIA CONTENT BASED ADVERTISING

RELATED APPLICATION

This application claims the benefit of priority under 35 USC 119(e) of U.S. Provisional Patent Application No. 61/649,317 filed May 20, 2012, the contents of which are incorporated herein by reference in their entirety.

FIELD AND BACKGROUND OF THE INVENTION

The present invention, in some embodiments thereof, relates to automatic content identification and, more particularly, but not exclusively, to methods and systems of selecting promotional content for automatically identified media content.

Internet advertisement can be used to generate revenue for web site owners. Current click models for advertisement are organized around space available on the web page. With the increasing adoption of higher speed links for internet access, media content is increasingly available on web sites. Ideally, advertisements should also be available to be played with media content to monetize media content web sites.

However, there are many formats for media content and many players that play media content so that it is difficult to address the placement of advertisements with a piece of media content. Moreover, some publishers rather not disclose the nature of media content items for which ad requests are distributed. This allows them to charge for the presentation of ads regardless to the related media content and/or watching browsers.

SUMMARY OF THE INVENTION

According to some embodiments of the present invention, there is provided a method of selecting a promotional content for media content. The method comprises providing a database hosting a plurality of uniform resource locators (URLs) each of a web document through which at least one of a plurality of media content items being available for presentation, receiving an ad request for embedding an in stream advertisement in a media content item, analyzing the ad request to extract a video content URL of a certain web document through which the media content item is made available for presentation, matching between the video content URL and at least one of the plurality of URLs to acquire at least one identifier of the media content item, selecting an in stream advertisement based on the at least one identifier, and responding to the ad request with an indication of the in stream advertisement.

Optionally, the ad request does not include a syntactic description of the media content item.

Optionally, the providing comprises automatically browsing a plurality of web documents, including the certain web document, to identify the plurality of URLs and to update the database.

More optionally, the automatically browsing is periodically repeated to update the database.

Optionally, the media content item is a video stream and the in-stream advertisement is selected from a group consisting of a pre-roll video clip, a mid-roll video clip, a post-roll video clip, at least one video overlay, and at least one interactive user interface for a video player.

Optionally, the media content item is an audio stream and the in-stream advertisement is selected from a group consisting a pre-roll audio clip, a mid-roll audio clip, a post-roll audio clip, at least one audio overlay, and at least one interactive user interface for an audio player.

Optionally, the database includes a table matching between the plurality of URLs and the plurality of media content items.

Optionally, the analyzing comprises extracting the URL from metadata of the ad request, the metadata being selected from a group consisting of a video ad-serving template (VAST) tag, a Flash (FLV) file redirection tag, and an advanced stream redirector (ASX) tag.

Optionally, the analyzing comprises extracting the URL from a player-ad interface wrapper of the ad request.

More optionally, the player-ad interface wrapper is a video player ad-serving interface definition (VPAID) wrapper.

Optionally, the certain web document is a web document referring to another web document hosting a player for rendering the media content item.

Optionally, the selecting comprises adapting the in stream advertisement to the media content item based on the at least one identifier.

Optionally, the selecting is performed according descriptive data extracted from the certain web document.

According to some embodiments of the present invention, there is provided an advertisement system of selecting a promotional content for media content. The system comprises a database of a plurality of uniform resource locators (URLs) each of a web document through which at least one of a plurality of media content items being available for presentation, an interface which receives an ad request for embedding an in stream advertisement in a media content item, a URL acquisition module which analyzes the ad request to extract a video content URL of a certain web document through which the media content item is made available for presentation, and a promotional content module which matches between the video content URL and at least one of the plurality of URLs to acquire at least one identifier of the media content item and responds to the ad request with an indication of an in stream advertisement selected based on the at least one identifier.

Optionally, the system further comprises a crawling module which automatically browses a plurality of web documents, including the certain web document, to identify and to update the URLs.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
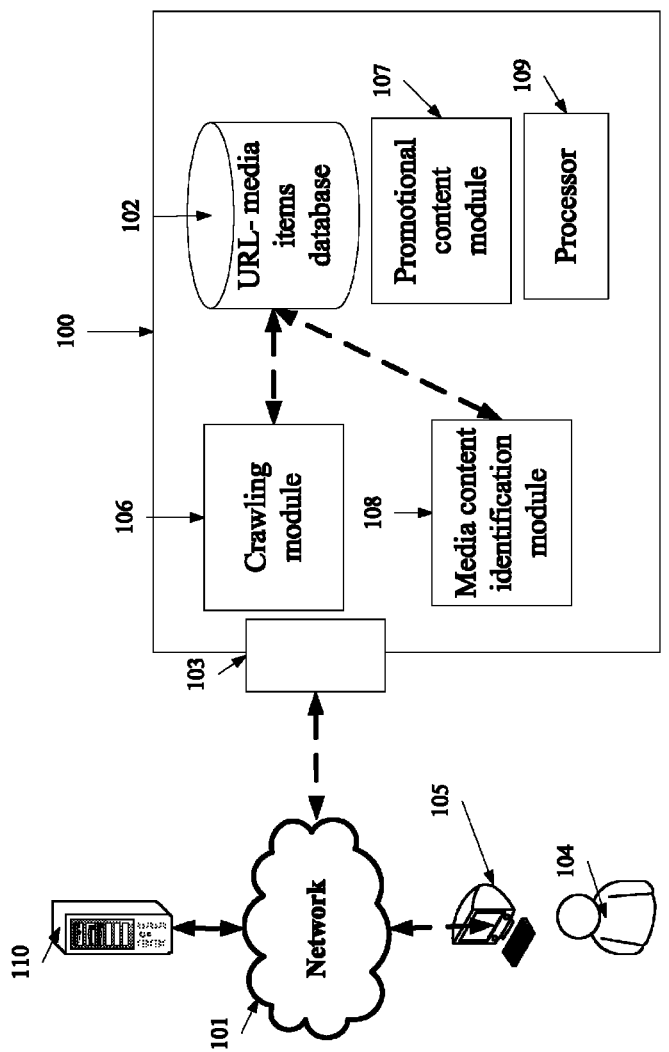
FIG. 1 is an advertisement system of selecting a promotional content, such as in-stream advertisements, for a media content based on a uniform resource locator (URL) of a web document through which the media content is available, for set to be rendered, according to some embodiment of the present invention.

The present invention, in some embodiments thereof, relates to automatic content identification and, more particularly, but not exclusively, to methods and systems of selecting promotional content for automatically identified media content.

According to some embodiments of the present invention, there are provided methods and systems of selecting in stream advertisements for embedding in a media content item based on a certain URL of a web document through which it is made available for presentation, for example for rendering. In these embodiments, an adrequest which may not include descriptive information pertaining to the media content item is analyzed to identify the certain URL. The certain URL is then matched with records in a database that associates between different URLs and media content item identifiers. This allows using one or more matching media content item identifiers to select one or more in stream advertisement(s) and to respond to the ad request with an indication of the selected in stream advertisement(s). In such a manner, in stream advertisements may be matched to a streamed and/or downloaded video and/or audio content even when the respective ad request does not include any descriptive information pertaining to the content itself.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is an advertisement system 100 of selecting a promotional content embedding in a media content, such as video and/or audio content, based on a uniform resource locator (URL) of a web document through which the media content is available, for set to be rendered, according to some embodiment of the present invention. The promotional content optionally includes one or more in-stream advertisement(s), such as video and/or audio clip(s), for example pre-roll, mid-roll, and/or post-roll, video overlays, for example interactive small web format (SWF) file that allows adding additional functionality to a displayed content (i.e. clicking the overlay pops up a browser window directed to a selected address), interactive user interfaces, for example a share button that allows users to share the content, and/or an audible overlay that is added to an audio file and/or to the soundtrack of a multimedia file.

The system 100, which is optionally implemented on one or more network servers, is connected to a network 101, such as the Internet. The system includes a network interface 103, such as a physical network port, for example a network interface card (NIC) that functions as an input module for receiving promotional content requests, such as adrequests. The functions of the systems are supported and/or executed using a processor 109. The network interface 103 receives the promotional content request from a client terminal 105 which loads a certain media content designated for in-stream advertisement. Additionally or alternatively, the network interface 103 may receive the promotional content from a content provider 110 which retrieves in-stream advertisements for embedding them in a certain media content loaded in response to a request from the client terminal 105 or from any adrequest generator entity. The content provider 110 is optionally a server managing one or more web documents accessed by the user 104. As used herein, and for brevity, a web document means a webpage having media content, a network accessible media file, a podcast loaded with in-stream advertisement(s), an extensible markup language (XML) page, a hypertext markup language (HTML) page, and/or any other network accessible content file. The promotional content request, which may be referred to herein as a request, may be in the form of any video ad request, including a request for a video advertisement, an audio advertisement, a text advertisement, and/or a banner.

The system 100 further includes a crawling module 106 which crawls or otherwise automatically browses a plurality of network documents to identify and map URLs of web documents through which media content items are made available, for example as described below, and a database 102 which stores the outcome of the automatic browsing. For example, the database 102 includes a hash table mapping between URLs and media content items. The mapping is optionally based on an analysis of the URL structure, for example according to the publisher who uses the URL (i.e. the website publisher) and metadata associated with this URL, for example extracted from a website and/or webpage retrieved therewith and/or with any prefix portion thereof.

The system 100 further includes a media content identification module 108 which extracts a URL of a web document pertaining to a media content item from which a request is received and uses the URL to identify the media content item based on data matched from the database 102. A promotional content module 107 may be used to select promotional content, such as in-stream advertisement, which is suitable for the identified media content item. The promotional content module 107 may be a component of the system 100 or an external network node that matches promotional content to media content items, such as an advertisement (ad) server.

Figure 2:
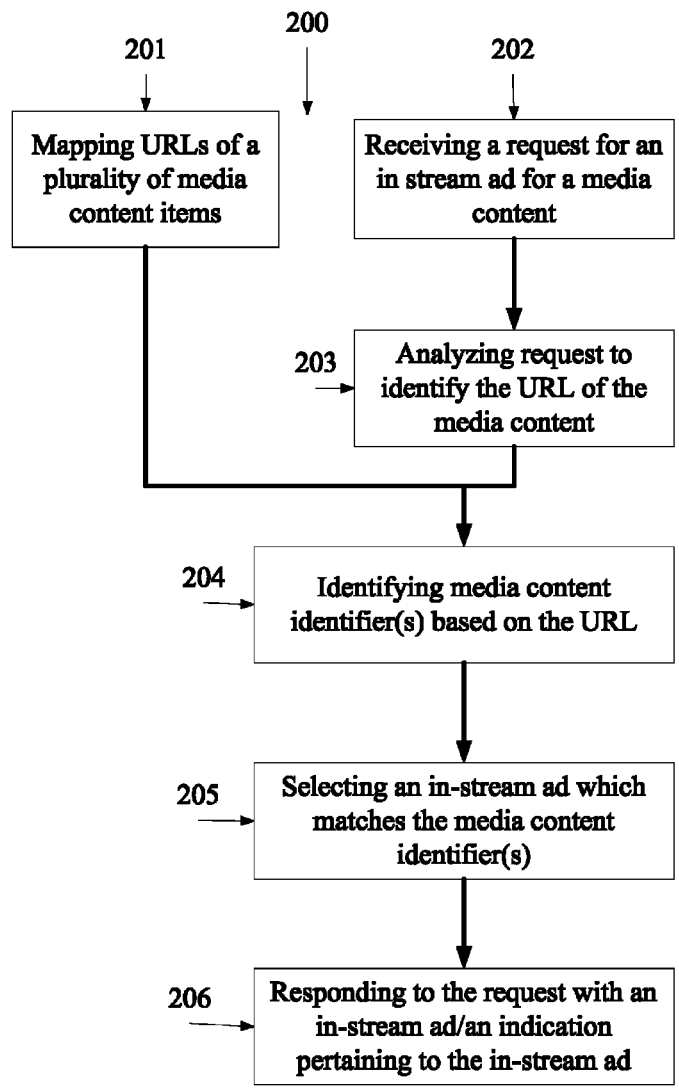
FIG. 2 is a method of selecting promotional content, such as in-stream advertisement(s), for media content based on a URL of a web document through which the media content is available, according to some embodiment of the present invention.

Reference is also made to FIG. 2, which is a method of selecting promotional content, such as in-stream advertisement(s), for media content based on a URL of a web document through which the media content is available, for example set to be rendered, according to some embodiment of the present invention.

First, as shown at 201, one or more websites, optionally including media content repositories, are automatically browsed to map a plurality of media content items in a plurality of web documents. The mapping associates between a URL of each web document through which one or more video data items are made available to users and the video data items. Optionally, the database 102 is updated according to the mapping. The database is optionally updated iteratively, for example on an hourly, a daily, a weekly, and/or a monthly basis. The URLs are optionally mapped in a hierarchal structure.

The mapping allows, as shown at 202-204, selecting in-stream advertisements to media content based on URL data extracted from an ad request without a syntactic analysis of the URL.

As shown at 202, a request, such as an ad request, for an in-stream advertisement to be loaded with reference to a certain media content item, for example between segments of the certain media content item or as an overlay therefore, is received. The request is optionally generated during the loading of a requested media content item, such as streamed and/or downloaded audio and/or video content.

Then, as shown at 203, the URL of the certain web document through which the media content is available, the URL of a parent web document of this web document and/or the URL of a web document referring to this web document, is acquired.

Figure 3:
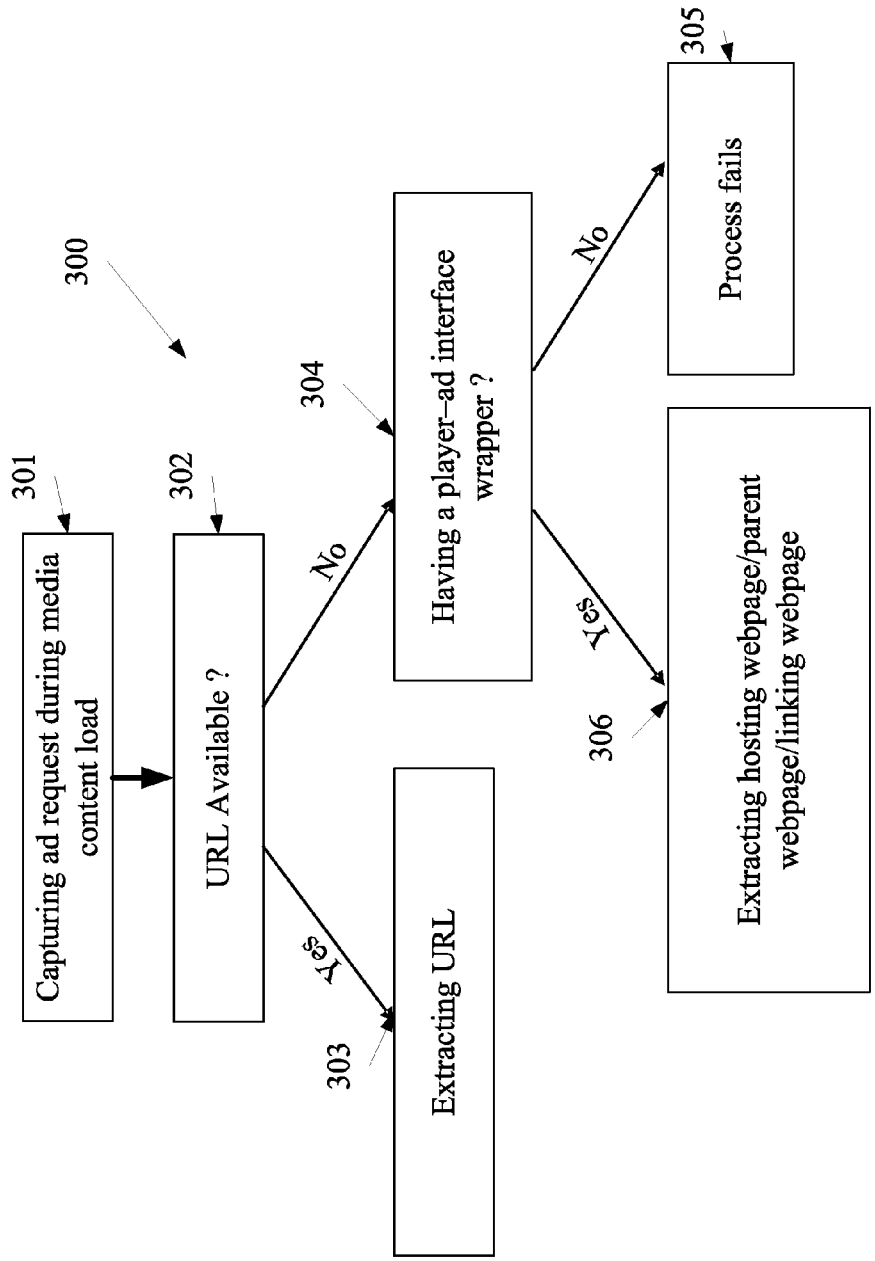
FIG. 3 is a process of acquiring a URL of a webpage through which media content item is made available, according to some embodiments of the present invention.

For example, reference is now made to FIG. 3, which is a process 300 of acquiring a URL of a web document through which media content item is made available, for example rendered, provided for streaming and/or downloading to a client terminal, according to some embodiments of the present invention.

First, as shown at 301, when media content is loaded, for example as described above, a respective ad request is captured. Then, as shown at 302, the metadata of the ad request is analyzed. If it includes a URL, the URL is extract as shown at 303. The URL may be extracted from metadata such as video ad-serving template (VAST) tags, Flash (FLV) file redirection tags, and/or advanced stream redirector (ASX) tags. Else, as shown at 304, one or more player-ad interface wrappers which enable an in-stream ad experience, for example video player ad-serving interface definition (VPAID) component/wrapper is extracted. If no URL is extracted and no player-ad interface wrapper is identified, the process fails, as shown at 305. Else, as shown at 306, the player-ad interface wrapper is analyzed to extract the URL of the web document through which the loaded media content is made available, for example rendered, the URL of a parent web document of this web document and/or the URL of a web document referring to this web document. The process depicted in FIG. 3 may be used for automatically browsing each of a plurality of web documents during 201.

Reference is now made, once again to FIG. 2. As shown at 204, after a URL is acquired, identifier(s) of the loaded media content are found according to a match between the identified URL and one of the URLs in the database. For example, the matching is done using the abovementioned hash table.

Now, as shown at 205, the media content identifier is matched with records of a promotional content database. In such a manner, an in-stream advertisement may be selected and/or adapted based on characteristics of the media content itself. For example, the content of the in-stream advertisement may be adjusted to relate to the media content, for instance to a displayed figure and/or scene.

The matching is optionally performed by the promotional content module 107 and/or an external network node. The promotional content database may be part of the system or a database accessed and/or managed by an external network node.

Additionally or alternatively, in-stream advertisement may be adjusted to relate to media content identified from an analysis of the webpage through which the media content is made available. In such an embodiment, the URL is mapped to one or more tags which are selected according to syntactic and/or semantic analysis of data which is presented in a respective webpage. In such an embodiment, the tags may include content descriptors, genre, actors and/or any other information that is extracted from the respective webpage. For example, page information such as appearance of certain key words such as health, pets, and/or lifestyle are extracted are used as tags.

Optionally, the tags are arranged in a hierarchal manner, facilitating a hierarchal selection of media content per advertisement.

Optionally, as shown at 206, the selected in-stream advertisement or an indication thereof is sent as a response to the received request. In such a manner, the in-stream advertisement may be presented with the identified content when the user 104 accesses the respective hosting web document using its client terminal 105.

It is expected that during the life of a patent maturing from this application many relevant systems and methods will be developed and the scope of the term a processor, a network node, a network and a client terminal is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available, for set to be rendered, as prior art to the present invention. To the extent that section headings are used, they should not be construed as necessarily limiting.

What is claimed is:

1. A method for of selecting promotional content for streaming media content based on an analysis of data extracted from player ad-interface wrappers of ad requests, comprising:
    providing a memory hosting a database that comprises plurality of uniform resource locators (URLs) each of a web document through which at least one of a plurality of browsed media content items is made available for presentation, wherein each of said plurality of URLs is associated with at least one media content item identifier based on at least one of a semantic analysis of respective said web document and said plurality of browsed media content items;
    executing code by at least one processor of at least one network server for performing the following:
        receiving an ad request for embedding an in stream advertisement in a media content item, said ad request having metadata;
        determining that said metadata does not contain a streaming media content URL;
        extracting a player ad-interface wrapper of an ad request sent during the loading of said requested media content item;
        extracting a certain streaming media content URL of a certain web document through which said media content item is made available for presentation by analyzing said player ad-interface wrapper;
            determining said at least one media content item identifier by matching between said certain streaming media URL and at least one of said plurality of URLs stored in said database;
        selecting an in stream advertisement based on said at least one media content item identifier; and
        responding to said ad request by transmitting an indication of said in stream advertisement.

2. The method of claim 1, wherein said ad request does not include descriptive information pertaining to said media content item.

3. The method of claim 1, wherein said providing comprises automatically browsing a plurality of web documents, including said certain web document, to identify said plurality of URLs and to update said database.

4. The method of claim 3, wherein said automatically browsing is periodically repeated to update said database.

5. The method of claim 1, wherein said media content item is a video stream and said in-stream advertisement is selected from a group consisting of a pre-roll video clip, a mid-roll video clip, a post-roll video clip, at least one video overlay, and at least one interactive user interface for a video player.

6. The method of claim 1, wherein said media content item is an audio stream and said in-stream advertisement is selected from a group consisting a pre-roll audio clip, a mid-roll audio clip, a post-roll audio clip, at least one audio overlay, and at least one interactive user interface for an audio player.

7. The method of claim 1, wherein said database includes a table matching between said plurality of URLs and said plurality of browsed media content items.

8. The method of claim 1, wherein said analyzing comprises extracting said certain streaming media content URL from metadata of said ad request, said metadata being selected from a group consisting of a video ad-serving template (VAST) tag, a Flash (FLV) file redirection tag, and an advanced stream redirector (ASX) tag.

9. The method of claim 1, wherein said player-ad interface wrapper is a video player ad-serving interface definition (VPAID) wrapper.

10. The method of claim 1, wherein said selecting comprises adapting said in stream advertisement to said media content item based on said at least one media content item identifier.

11. The method of claim 1, wherein said selecting is performed according descriptive data extracted from said certain web document.

12. A non-transitory computer readable medium with an executable program stored thereon, wherein said executable program instructs a processing device to perform steps for selecting promotional content for streaming media content based on an analysis of data extracted from player ad-interface wrappers of ad requests, said steps comprising:
    providing a database hosting a plurality of uniform resource locators (URLs) each of a web document through which at least one of a plurality of browsed media content items is made available for presentation, wherein each of said plurality of URLs is associated with at least one media content item identifier based on at least one of a semantic analysis of respective said web document and said plurality of browsed media content items;

receiving an ad request for embedding an in stream advertisement in a requested video and audio content, said ad request having metadata;

determining that said metadata does not contain a streaming media content URL;

extracting a player ad-interface wrapper of an ad request sent during the loading of said requested media content item;

extracting a certain streaming media content URL of a certain web document through which said requested video and audio content is made available for presentation by analyzing said player ad-interface wrapper;

determining said at least one media content item identifier by matching between said certain streaming media URL and at least one of said plurality of URLs stored in said database;

selecting an in stream advertisement based on said at least one media content item identifier; and instructing to respond to said ad request by transmitting an indication of said in stream advertisement.

13. An advertisement system executing on at least one processor for selecting promotional content for streaming media content based on an analysis of data extracted from player ad-interface wrappers of ad requests, comprising:

a memory storing database of a plurality of uniform resource locators (URLs) each of a web document through which at least one of a plurality of browsed media content items is made available for presentation, wherein each of said plurality of URLs is associated with at least one media content item identifier based on at least one of a semantic analysis of respective said web document and said plurality of browsed media content items;

an interface which receives an ad request for embedding an in stream advertisement in a requested video and audio content;

a processor adapted to perform the steps comprising:

providing said database;

receiving an ad request for embedding an in stream advertisement in a requested video and audio content, said ad request having metadata;

determining that said metadata does not contain a streamin media content URL;

extracting a player ad-interface wrapper of an ad request sent during the loading of said requested media content item;

extracting a certain streaming media content URL of a certain web document through which said requested video and audio content is made available for presentation by analyzing said player ad-interface wrapper;

determining said at least one media content item identifier by matching between said certain streaming media URL and at least one of said plurality of URLs stored in said database;

selecting an in stream advertisement based on said at least one media content item identifier; and instructing responding to said ad request by transmitting an indication of said in stream advertisement.

14. The system of claim 13, wherein said processor is further adapted to perform the step of automatically browsing a plurality of web documents, including said certain web document, to identify and to update said URLs.

\* \* \* \* \*